(12) United States Patent
Benedict

(10) Patent No.: US 7,104,438 B2
(45) Date of Patent: Sep. 12, 2006

(54) METHOD OF INTEGRATING TIRE IDENTIFICATION INTO A VEHICLE INFORMATION SYSTEM

(75) Inventor: Robert Leon Benedict, Tallmadge, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 57 days.

(21) Appl. No.: 10/690,876

(22) Filed: Oct. 22, 2003

(65) Prior Publication Data

US 2005/0087593 A1   Apr. 28, 2005

(51) Int. Cl.
*G06F 17/00* (2006.01)
*G07B 15/02* (2006.01)

(52) U.S. Cl. .............. 235/375; 235/384; 235/385; 340/442; 340/447; 73/146.5

(58) Field of Classification Search ............ 235/375, 235/376, 384, 385; 340/442, 445, 447, 572.8; 73/146.5
See application file for complete search history.

(56) References Cited

U.S. PATENT DOCUMENTS

| | | | | |
|---|---|---|---|---|
| 6,149,060 A * | 11/2000 | Meadows | ............. | 235/462.01 |
| 6,246,317 B1 * | 6/2001 | Pickornik et al. | ........... | 340/447 |
| 6,400,261 B1 | 6/2002 | Starkey et al. | ............. | 340/442 |
| 6,591,671 B1 | 7/2003 | Brown | ............. | 73/146.5 |
| 6,612,165 B1 | 9/2003 | Juzswik et al. | ............. | 73/146.5 |
| 6,622,552 B1 | 9/2003 | Delaporte | ............. | 73/146 |
| 6,838,985 B1 * | 1/2005 | Ghabra et al. | ............. | 340/445 |
| 6,864,785 B1 * | 3/2005 | Marguet et al. | ............. | 340/447 |
| 6,882,270 B1 * | 4/2005 | Stewart et al. | ............. | 340/442 |
| 6,885,296 B1 * | 4/2005 | Hardman et al. | ............. | 340/505 |
| 6,906,624 B1 * | 6/2005 | McClelland et al. | ......... | 340/442 |
| 6,917,417 B1 * | 7/2005 | Strege et al. | ............. | 356/139.09 |
| 6,972,671 B1 * | 12/2005 | Normann et al. | ............. | 340/442 |
| 6,999,861 B1 * | 2/2006 | Katou | ............. | 340/442 |
| 7,010,968 B1 * | 3/2006 | Stewart et al. | ............. | 73/146 |
| 7,015,801 B1 * | 3/2006 | Juzswik | ............. | 340/442 |

(Continued)

FOREIGN PATENT DOCUMENTS

EP   0689950   1/1996

OTHER PUBLICATIONS

"Michelin Introduces radio frequency Tire Identification Technology", Motor Trend, Jan. 16, 2003, p. 1, XP002310530-Retrieved from the Intgernet: URL:http://www.motortrend.com.

*Primary Examiner*—Jared J. Fureman
(74) *Attorney, Agent, or Firm*—Richard B. O'Planick

(57) ABSTRACT

A method for integrating tire identification data into a vehicle information system comprises the steps: mounting a tire to a production line vehicle chassis, the tire having tire data storage for storing tire identification data; connecting the tire stored data to a vehicle electronic control unit (ECU) having ECU data storage; reading tire identification data from the stored tire data into the ECU stored data; and uploading the tire identification data from the ECU stored data to an OEM database. The method may optionally include incorporating a tire pressure monitoring system into the tire; and including tire pressure monitoring system identification data in the tire identification data. The vehicle identification data may be incorporated into the ECU stored data and uploaded with the tire identification information to an OEM database at a preferred point in the vehicle assembly line sequence that coincides with the execution of an end-of-line diagnostic test on the vehicle.

10 Claims, 11 Drawing Sheets

U.S. PATENT DOCUMENTS

| | | |
|---|---|---|
| 7,015,802 B1 * | 3/2006 | Forster ....................... 340/445 |
| 7,019,628 B1 * | 3/2006 | Ichinose ..................... 340/442 |
| 2002/0084896 A1 | 7/2002 | Dixit et al. ................. 340/447 |
| 2002/0126005 A1 * | 9/2002 | Hardman et al. ........... 340/442 |
| 2003/0122661 A1 | 7/2003 | Ginman et al. ............. 340/447 |
| 2003/0145650 A1 * | 8/2003 | Juzswik et al. ............... 73/146 |
| 2003/0227379 A1 * | 12/2003 | Itou ........................... 340/442 |
| 2004/0084517 A1 * | 5/2004 | Harm et al. ................. 235/375 |
| 2004/0095244 A1 * | 5/2004 | Conwell et al. ......... 340/572.8 |

* cited by examiner

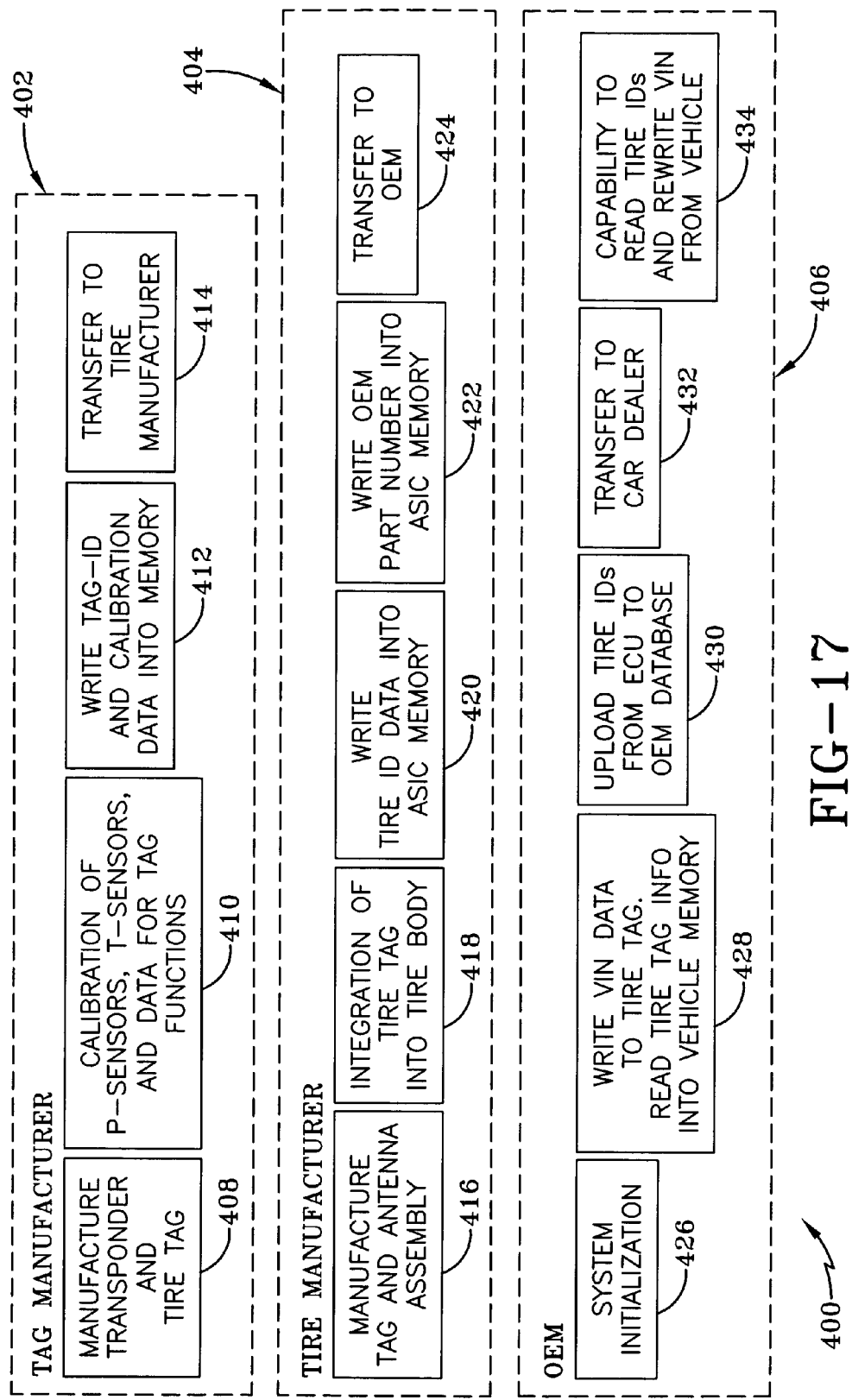

METHOD OF INTEGRATING TIRE IDENTIFICATION INTO A VEHICLE INFORMATION SYSTEM

FIELD OF THE INVENTION

The invention relates generally to a method for integrating tire data into the information system of a vehicle and, more specifically, within tire systems comprising a tire pressure monitoring system.

BACKGROUND OF THE INVENTION

Safe, efficient and economical operation of a vehicle depends, to a significant degree, on maintaining the correct air pressure in the tires of the vehicle. Failure to promptly correct faulty air pressure may result in excessive tire wear, blowouts, poor gasoline mileage, and steering difficulties. Hence, it is generally desirable to provide a low pressure warning system within the vehicle to alert the driver to the loss of air in a pneumatic tire. The means for warning a driver may comprise a light on the dashboard or an audible alarm.

To this end, a number of electronic devices and systems are known for monitoring the pressure of pneumatic tires, and providing the operator of the vehicle with either an indication of the current tire pressure or alerting the operator when the pressure has dropped below a predetermined level. It is known, for example, to monitor tire pressure with a transponder that is capable of receiving and transmitting radio frequency signals and impressing variable information (data) in a suitable format upon the transmitted signal indicative of one or more measured conditions such as pressure and temperature. A "tag", as used herein, refers either to a transponder having transmitting and receiving capability or to a device that has only transmitting capability. Generally, a tire pressure monitoring system (TPMS) indicates an overall system comprising tags within the tires and a receiver disposed within the vehicle.

It is known to mount a tag and associated condition sensor within each tire of a vehicle and collect information from each transponder with a receiver mounted to the vehicle. The tag may be mounted to a valve stem or attached to an inner liner of the tire. Data received from the tag by the receiver is transmitted to a display unit for alerting the vehicle operator on the status of each tire. Electronic data processing circuitry for receiving and interpreting sensor data for appropriate display is typically part of the TPMS. A common approach within the industry is to implement a transponder as an integrated circuit chip on a printed circuit board within the tag. An application specific integrated circuit (ASIC) is typically employed and may include memory for storing measurement or transponder identification data. Data from the transponder to a reader is typically facilitated by radio frequency (RF) signal transmission.

It is common within the industry for the tag and transponder to be manufactured by an electronics entity and supplied to a tire manufacturer for incorporation into a tire. The tire, having the transponder and tire tag operatively coupled thereto, is then transferred to an original equipment manufacturer (OEM) and mounted to a production line vehicle. The tires for any given vehicle are generally mounted to the chassis frame at some point in the assembly line and proceed with the chassis down the assembly line to an end point.

It is further a standard practice in the vehicle manufacturing processes used by the industry to incorporate a vehicle electronic control unit (ECU) within the vehicle to control and monitor vehicular electronic systems. The ECU is incorporated within the vehicle during the assembly process and interconnected to electrical components and systems upon their installation. At or near the end point of the assembly process, the vehicle electronic control unit (ECU) conducts a system diagnostic test, testing components and systems for operational performance. Typically, data from the diagnostic test is then uploaded to an OEM data base and retained for future reference should the need arise.

The identity of the transponder and tag is designated by the manufacturer of such components by an identification code. Likewise, the tire manufacturer maintains an information system database that identifies each tire it produces by an identification code. Similarly, the OEM utilizes a vehicle-specific identification code, commonly referred to as a vehicle identification number (VIN). The VIN is maintained in an information system database and provides the basis for tracking a given vehicle throughout its operational life. The vehicle electronic control unit (ECU) that electronically controls the operation of sundry systems within the vehicle may further be encode with the VIN identification number. The OEM may further employ a part number for identifying the specific tire that is mounted to any given vehicle. The part number is typically used for inventory control and re-ordering procedures.

It is generally desirable for an OEM to maintain tire identification information so as to enable the OEM cross-reference the particular tires with the assembly line vehicles to which the tires are mounted. Such tire identification data may be manually inputted into a database but such a procedure is inefficient and labor intensive, whereby undesirably adding to the manufacturing cost. Alternatively, the manufacturer (OEM) may employ readers along the assembly line to read tire identification off the tires as the tires pass the reader. Employing such a dedicated system of tire readers along the assembly line for the sole purpose of reading tire identification codes is, however, expensive and inefficient.

The aforementioned division of responsibility between the transponder/tag, tire, and vehicle manufacturers generally works well with each party operating within respective spheres of expertise and maintaining respective databases identifying the products produced by each manufacturer. Heretofore, however, there has been no systematic method or process for conveniently integrating data from the transponder/tag, tire, and vehicle manufactures into a single readily accessible database. Specifically, there has been no systematic method or process for conveniently and readily associating the transponder/tag, tire, and vehicular identification codes and operational parameters into a single database for future reference by those parties having a need to cross-reference such data. Those parties having such a need can include the manufacturer of the transponder/tag, tire, or vehicle, or down stream dealers responsible for the sale and maintenance of the vehicle.

There is, therefore, a long felt need for a system to gather and maintain positive tire identification data without the need for external dedicated antenna and reader systems along the assembly line. Further, a needs exist for a method and procedure for effectively and efficiently gathering and storing in a single database transponder/tag, tire, and vehicle identification data and related information so as to be readily accessible by interested parties. Vehicle dealers would thereby be in a position to conveniently access and retrieve tire information from the database for determining, by way of example, whether a given tire has been changed or replaced. Such a capability, if available, would be desirable in affording the transponder, tire, and vehicle manufacturers, as well as the vehicle dealer selling and servicing the vehicle, with means for tracking the history of the various components comprising the TPMS. In the event of a system or component failure, specific information would thus be available to determine the identity of the various components that were originally combined to create the TPMS. Moreover, the replacement or substitution of all or portions of the TPMS could be monitored throughout the life of the vehicle in order to aid in failure analysis in the event of system malfunction or damage.

SUMMARY OF THE INVENTION

The present invention provides a method for integrating tire data into the information system of a vehicle. According to one aspect of the invention, the method comprises the steps of mounting a tire to a production line vehicle chassis, the tire having tire data storage means for storing tire identification data; connecting the tire data storage means to a vehicle electronic control unit (ECU) having ECU data storage means; reading tire identification data from the tire data storage means into the ECU data storage means; and uploading the tire identification data from the ECU data storage means to an OEM database. According to another aspect of the invention, the method includes incorporating a tire pressure monitoring system into the tire; and including tire pressure monitoring system identification data in the tire identification data. Pursuant to a further aspect of the invention, tire pressure monitoring system operational parameters are incorporated within the tire identification data. According to yet a further aspect of the inventive method, vehicle identification data is incorporated into the ECU data storage means and uploaded to an OEM database. A further aspect of the invention reads tire identification data from the tire data storage means into the ECU data storage means substantially coincidental with the running of a diagnostic test by the ECU substantially at the conclusion of vehicular assembly.

Definitions

"Axial" and "axially" means the lines or directions that are parallel to the axis of rotation of the tire.

"Bead" or "bead core" generally means that part of the tire comprising an annular tensile member of radially inner beads that are associated with holding the tire to the rim; the beads being wrapped by ply cords and shaped, with or without other reinforcement elements.

Circumferential" most often means circular lines or directions extending along the perimeter of the surface of the annular tread perpendicular to the axial directs; it can also refer to the direction of the sets of adjacent circular curves whose radii define the axial curvature of the tread, as viewed in cross section.

"Inner" means toward the inside of the tire and "outer" means toward its exterior.

"Lateral" means in a direction parallel to the axial direction.

"Radial" and "radially" mean directions radially toward or away from the axis of rotation of the tire.

"Shoulder" means the upper portion of sidewall just below the tread edge.

"Sidewall" means that portion of tire between the tread and the bead.

BRIEF DESCRIPTION OF THE DRAWINGS

FIG. 17 is a block diagram illustrating the subject tire tag initialization procedure.

DETAILED DESCRIPTION OF THE INVENTION

Figure 1:
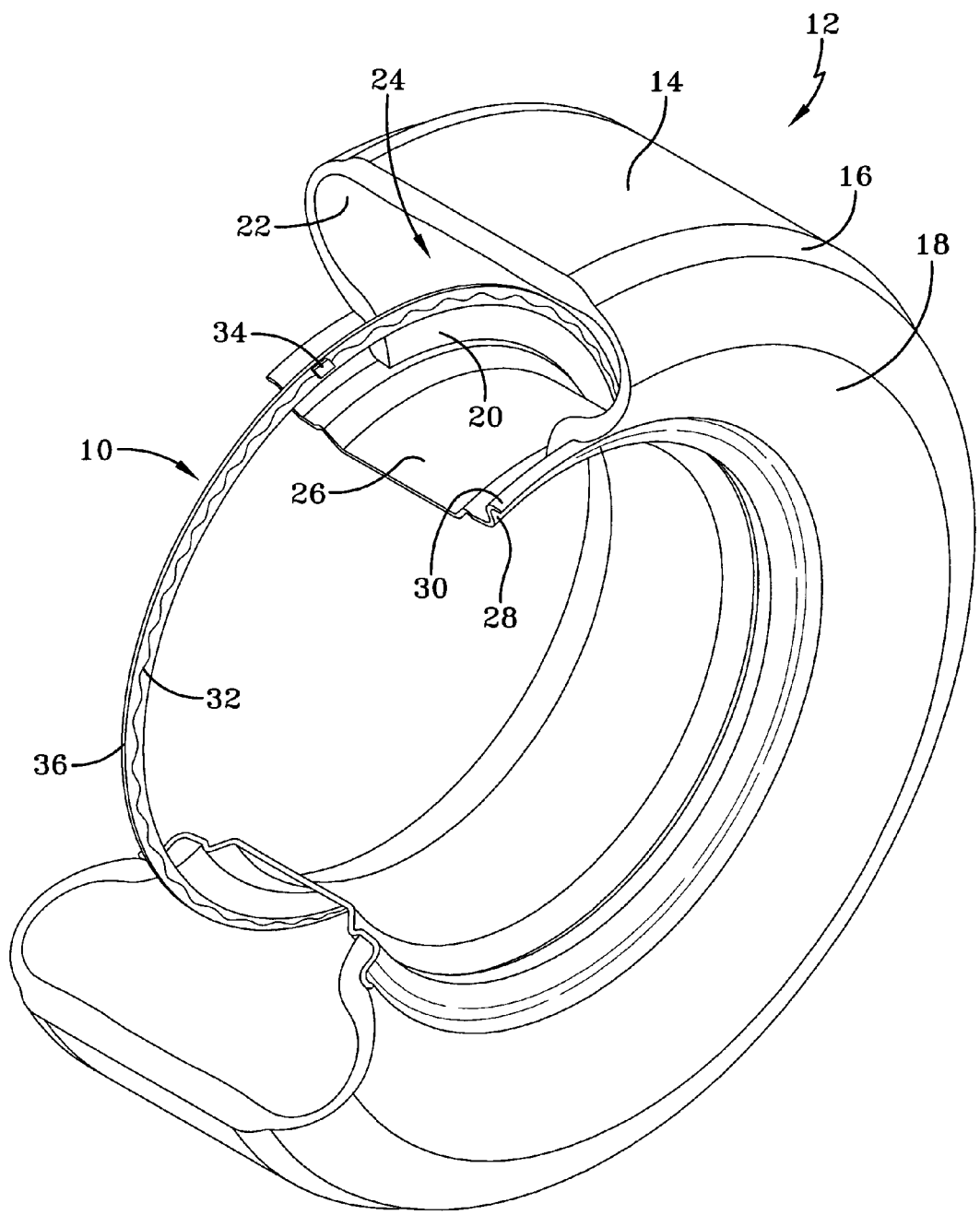
FIG. 1 is a perspective view of a representative tire, antenna, and transponder apparatus with portions of the tire removed for the purpose of illustration.

As used herein, a "transponder" is an electronic apparatus (device) capable of monitoring a condition such as air pressure within a pneumatic tire, and then transmitting that information to an external device. The external device can be either an RF (radio frequency) reader/interrogator or, simply an RF receiver. A simple receiver can be used when the transponder is "active", and has its own power source. A reader/interrogator would be used when the transponder is "passive" and is powered by an RF signal from the reader/interrogator. In either case, in conjunction with the external device, the transponder forms a component of an overall tire-condition monitoring/warning system. A toroidal body composed of a material of high electro-magnetic permeability is coupled to the transponder by a winding. In conventional systems, the antenna is coupled to the toroidal body by means of a primary winding and the transponder is coupled to the toroidal body by means of a secondary winding. As explained below, the primary winding is eliminated in accordance with the practice of the subject invention. The "secondary" winding that couples a transponder to the toroidal body hence is referred to herein as merely the "winding". For the purpose of the subject disclosure and the invention, the annular system is not transponder specific. That is, a wide range of commonly available transponders, sensors, and associated electronics may be packaged and utilized with the subject invention.

As used herein, a "toroid" is a body formed from material having a high elector-magnetic permeability by a continuous curved surface and includes a central through bore. The toroidal body may be cylindrical, oblong, symmetrical, or asymmetrical without departing from the invention herein set forth. As used herein, a "toroidal body" thus includes a transformer having one or more windings.

In order to send or receive RF signals, a transponder must have an antenna. The antenna is annular in configuration in the subject invention and may either be incorporated into the tire during manufacture or affixed to the tire by way of a post manufacture procedure. As used herein, an "annular antenna" may be circular, oblong, symmetrical, or asymmetrical without departing from the subject inventive principles. However, the preferred configuration of the antenna is circular and sized to overlap the tire sidewall region to which it attaches. The antenna may comprise a single wire or a plurality of strands. Various commercially available transponders, sensors, and other electrical devices deployed in combination with an annular antenna formed from conventional conductive materials are suitable for use in conformance with the principles of the subject invention.

Acceptable materials for the antenna wire include steel, aluminum, copper or other electrically conducting wire. As disclosed in this patent document, the wire diameter is not generally considered critical for operation as an antenna for a transponder. For durability, stranded steel wire consisting of multiple strands of fine wire is preferred. Other wire options available include ribbon cable, flexible circuits, conductive film, conductive rubber, etc.

Referring initially to FIG. 1, a preferred embodiment 10 of a TPMS is shown deployed within a tire 12. The tire 12 is formed from conventional materials such as rubber or rubber composites by conventional means and may comprise a radial ply or bias ply configuration. A typical tire 12 is configured having a tread 14, a shoulder 16, an annular sidewall 18, and a terminal bead 20. An inner liner 22 is formed and defines a tire cavity 24. The tire 12 is intended for mounted location upon an annular rim 26 having a peripheral rim flange and an outer rim flange surface 30. Rim 26 is conventionally configured and composed of a suitably strong metal such as steel.

An annular antenna 32 is provided and, in the preferred embodiment, embodies a sinusoidal configuration. Antenna 32 may be alternatively configured into alternative patterns or comprise a straight wire(s) if desired and may be filament wire, or cord or stranded wire. Acceptable materials for the wire include steel, aluminum, copper or other electrically conducting wire. As mentioned previously, the wire diameter is not generally considered critical for operation as an antenna and multiple strands of fine wire is preferred. The curvilinear form of antenna 32 provides flexibility and minimizes the risk of breakage during manufacture and use explained below.

With continued reference to FIG. 1, a transponder module 34 of the general type described above is provided and may include means for sensing tire parameters such as pressure and temperature. Included as part of the apparatus 10 is a carrier strip of material 36 formed into the annular configuration shown. Carrier strip 36 is formed of electrically insulating, preferably semi-rigid elastomeric material common to industry such as rubber or plastic. The strip 36 is formed to substantially encapsulate the antenna wire(s) 32 and at least a portion of the transponder module 34 in the manner described below. In the post manufacturing state, therefore, the apparatus 10 comprising antenna 32, transponder module 34, and carrier strip 36, in a unitary, generally circular, semi-rigid assembly that is readily transportable and handled for attachment to tire 12. The diameter of the apparatus assembly 10 is a function of the size of the tire 12 and the preferred attachment location thereon.

Figure 2:
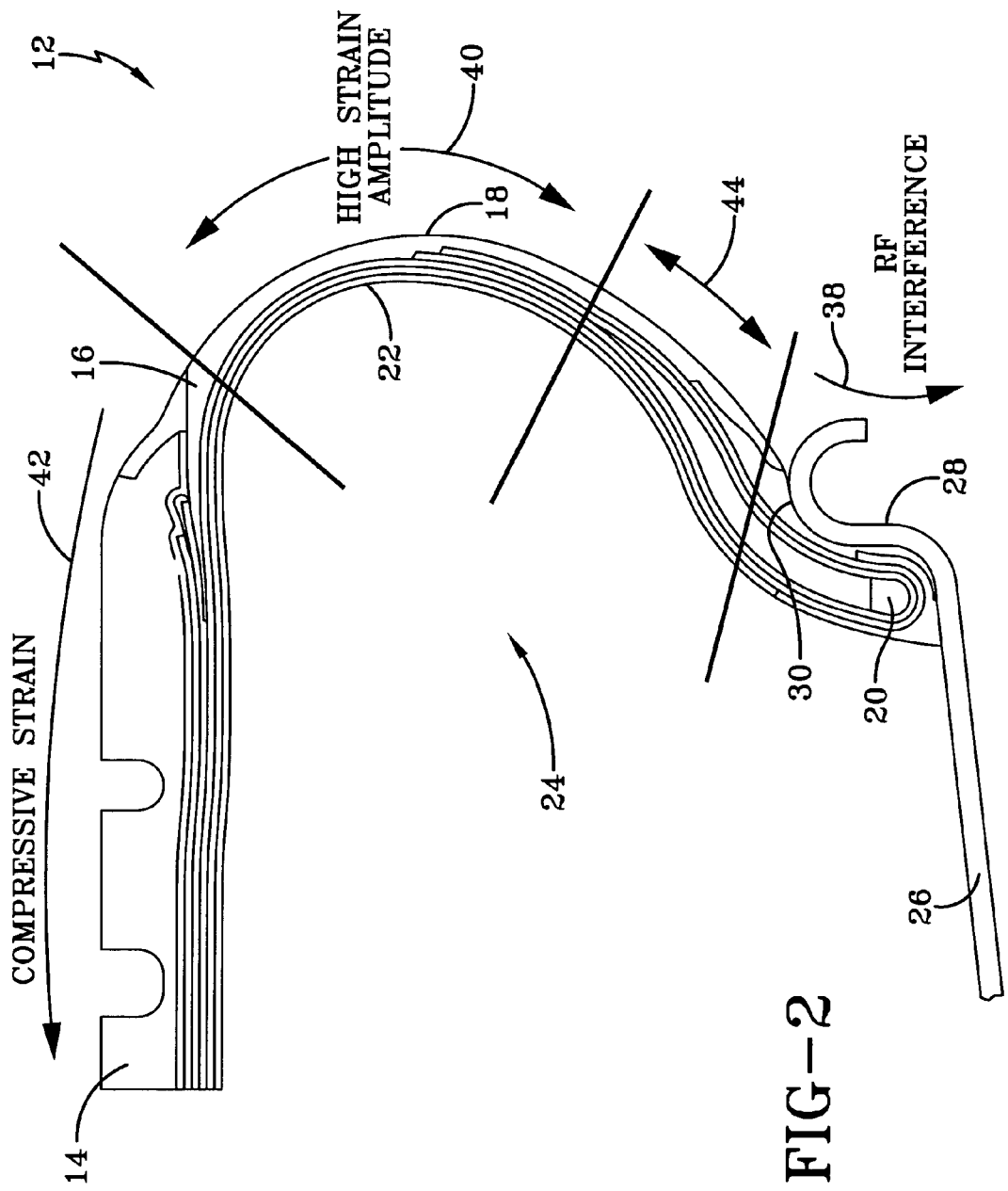
FIG. 2 is a sectional schematic of a tire mounted to a rim and illustrating alternative locations in which to mount the subject annular apparatus.

FIG. 2 illustrates a preferred location for annular apparatus 10 on a tire. The tire 12 is mounted to a rim 26 in conventional fashion. The bead 20 of tire 12 is disposed within the rim 26 against flange 28. Upper surface 30 of the flange 28 is located above a lower edge of the tire bead 20. As will be appreciated, the flange 28 shields the lower portion of the tire 12 comprising bead 20 and defines an "RF INTERFERENCE" region 38 of the tire. A region 40 of tire 12 above region 38 at the sidewall 18 is further defined as a "HIGH STRAIN AMPLITUDE" region. As sidewall 18 flexes during operation of the tire on a vehicle, region 40 experiences a high level of strain. The region 42 located at the tread portion of the tire is referred to herein for explanatory purposes as a "COMPRESSIVE STRAIN" region. It is at region 42 that the tire 12 experiences a high level of compressive strain as the tire is operatively utilized.

In combined reference to FIGS. 1 and 2, the apparatus 10 is affixed to liner 22 of the tire 12 either during manufacture of the tire or, as preferable, in a post-manufacture assembly operation. Attachment may be by means of an adhesive or the apparatus may be embedded into the tire itself during manufacture. Adhesives commonly utilized in the industry for tire patch and repair may be employed. The location on the tire to which apparatus 10 is attached pursuant to the instant invention is region 44 in FIG. 2, located between the RF INTERFERENCE region 38 and the HIGH STRAIN AMPLITUDE region 40. It will be appreciated that region 38 would be equitable from a mechanical perspective since tire region 38 is relatively rigid, protected by rim flange 28, and, experiences a relatively low strain level during operation of the tire. From an electrical perspective, however, region 38 of the tire 12, shielded by rim flange 28, is ill suited as a location for the transponder 34.

Location of the apparatus 10 within region 40 of the tire sidewall 18 is an option. Such a location would avoid the RF Interference caused by the rim. However, the tire sidewall 18 experiences high levels of strain during operation of the tire. Consequent damage to or breakage of components affixed to the sidewall may occur. Similarly, location of the apparatus 10 at the tread region 42 of tire 12 would avoid RF Interference from the rim but the tread region experiences high compression strain during operation of the tire. Location of tire monitoring system devices in such a location would be therefore be undesirable from a mechanical perspective.

Consequently, apparatus 10 is preferably located within region 44 of the tire 12. Region 44 is generally an annular region located substantially between 10 to 30 millimeters above the upper surface 30 of the rim flange 28 when tire 12 is mounted to rim 26. Within region 44, the apparatus is free from RF Interference from the flange 28 of rim 26. Region 44 is further a relatively low strain amplitude region of the tire 12. Thus, region 44 of the tire 12 represents an optimal location for apparatus 10 that balances the need for minimal RF Interference from the rim while mechanically protecting the apparatus 10 from damage due to strain forces introduced into the tire during its operation.

Figure 3:
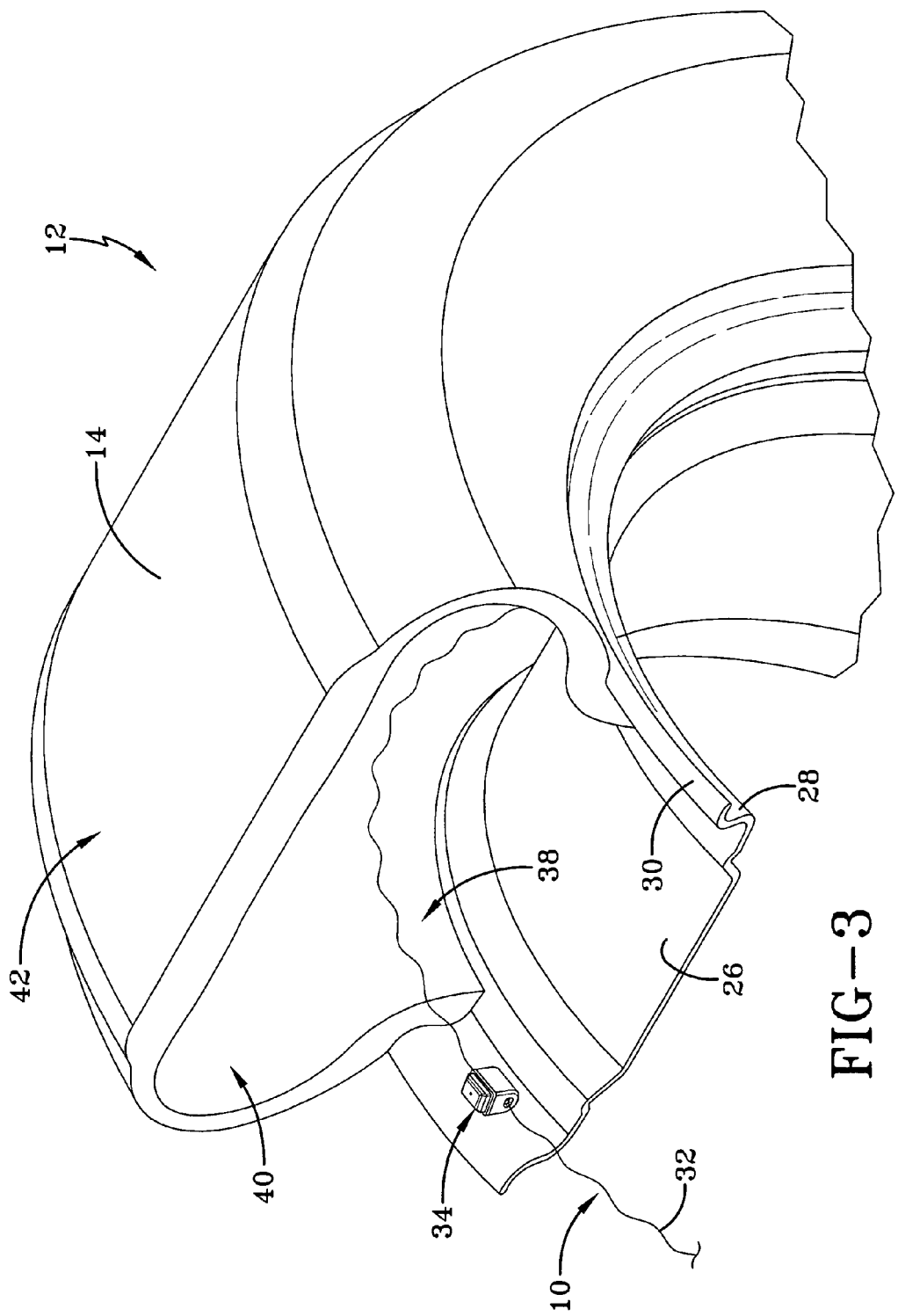
FIG. 3 is an enlarged perspective view of a tire portion having a transponder and antenna assembly positioned against a tire sidewall surface.

FIG. 3 illustrates an alternative embodiment of the subject apparatus 10 in which the carrier strip 36 is eliminated and the antenna 32 and transponder 34 are embedded directly within the tire 12 during its manufacture. The location of the antenna 32, again, is within region 44 described as optimal in the preceding paragraph; that is, approximately 10–30 millimeters above the rim flange surface 30 when tire 12 is mounted to rim 26. Attaching the apparatus 10 into tire 12 during its manufacture is possible pursuant to the invention but is not preferred since such a procedure would necessarily expose the transponder 34 and antenna to potentially damaging forces as the tire is formed. Also, implanting an exposed annular antenna 32 and transducer 34 makes replacement and repair of the assembly in the event of damage or breakage problematic. Consequently, it is preferable to attach the apparatus 10 to the tire 12 in a post manufacture process by adhesives or the like. The advantages of post manufacture assembly is that the apparatus 10 is spared the stress of the tire manufacturing process and the apparatus 10 may readily be removed and replaced in the event of breakage. Moreover, the unitary apparatus 10 shown in FIG. 1 may readily be retrofitted by adhesive to pre-manufactured or used tires. Finally, the annular apparatus is a unitary assembly and may be conveniently inventoried in a range of diametric sizes so as to fit various sized pre-manufactured tires.

Figure 4:
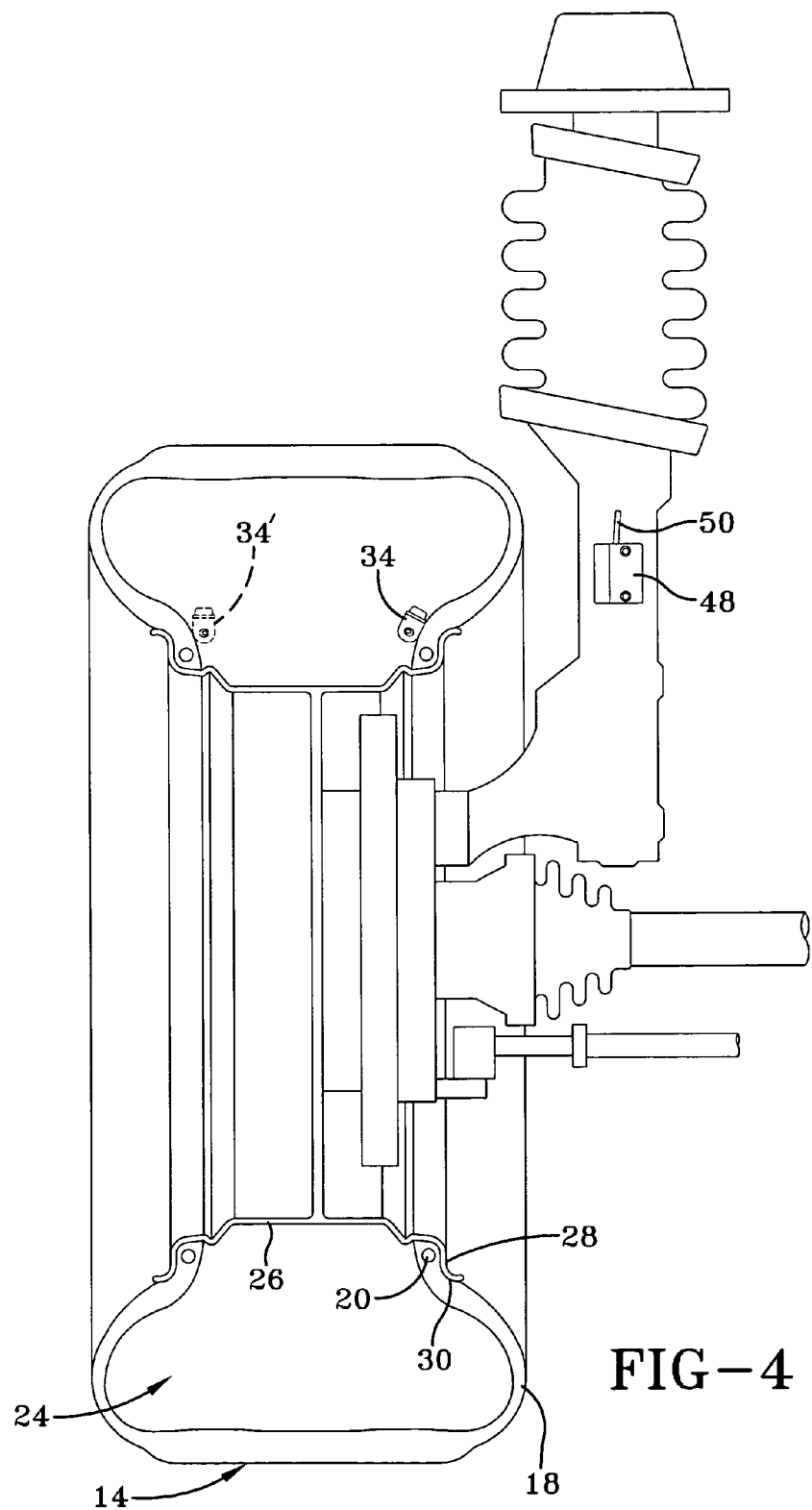
FIG. 4 is a sectional schematic view of a tire and wheel assembly mounted to a vehicle frame.

FIG. 4 shows the transponder 34 located at its preferred location on a tire 14 and exposed to the tire cavity 24. The transponder may include pressure and temperature sensors for monitoring the status of the cavity 24 and communicate such information to a remote transceiver 48 mounted to the vehicle frame 46. The transceiver 48 is positioned opposite the antenna of the apparatus 10 and is in continuous communication therewith throughout the 360 degrees rotation of the tire 14. Transceiver 48 is of a type commercially available in the industry and is electrically connected by lead 50 to conventional logic, processing and display electronics of the vehicle. As described previously, the position of the transponder module 34 is above the rim flange 28 so that RF communication between the transponder and the transceiver 48 is not impaired.

With collective reference to FIGS. 5–12, the configuration of the annular apparatus 10 will be explained in greater detail. The transponder module generally comprises a base housing 52 formed of rubber or plastic material by conventional means. The housing 52 includes opposite sidewalls 54, 56 joining along a radiused bottom surface 55 to opposite vertical end walls 58, 60. The walls 54, 55, 56, 58, and 60 define a central compartment 62. A through bore 64 extends through lower portion of the end walls 58, 60 in communication with the compartment 62.

The housing 52 further includes a cap member 68 likewise formed of conventional rubber or plastic material by conventional means such as injection molding. The cap member 68 includes an upper protrusion or "snout" 70 comprising vertical sidewalls 72 terminating at a horizontal upper surface 74. A sensor port or aperture 76 is positioned at the middle of surface 74 and extends therethrough. A flange 78 peripherally defines a lower boundary of cap 68 and provides a horizontal ledge surface 80 that merges at a right angle with the vertical sidewalls 72. The flange 78 is dimensioned to rest upon the upper end of the module base housing 52 as will be appreciated. The horizontal ledge surface 80 of cap 68 is disposed between the flange 78 and the vertical sidewalls 72. Upper sidewall portions 81 are provided that taper inwardly toward upper surface 74. The tapered profile of the cap 68 facilitates convenient and reliable manufacture of the apparatus 10.

In the illustrated embodiment, the transponder module 34 further includes a toroidal body (toroid) 82 composed of a material, such as a ferrite, having a high electro-magnetic permeability. The body 82 generally comprises a cylinder having an elliptical cross-sectional configuration. The elliptical sectional configuration of body 82 serves to reduce its vertical dimension and allows for a more compact packaging of the body 82 within a transponder module. The body 82 includes a winding 84, as shown, terminated to conductor leads 86. A central through bore 88 projects through the body 82 in an axial or longitudinal direction.

A protective sleeve member 90 is further provided sized for receipt and residence with the bore 88 of body 82. The sleeve 90 comprises generally an elongate cylinder having an elliptical cross-section. The sleeve 90 further includes a circumferential sidewall 92 and an axial or longitudinal through bore 94. Bore 94 is offset relative to the longitudinal axis of the sleeve 90 so as to create a wall 95 of increased thickness at an outward side of the sleeve 90. An outwardly open longitudinal channel 96 is formed within the wall 95 as shown. The sleeve 90 is closely received within bore 88 of body 82 and winding 84 is received within the channel 96 of sleeve 90.

With continued reference to FIGS. 5–12, a circuit board 98 mounts within the central compartment 62 of the transponder base housing 52. Circuit board 98 is typically configured to comprise an electronic package 100 mounted to an upper surface 102 and may include an electronic package 106 mounted to an underside 104. The packages 100, 106 are commonly referred to as an "application specific integrated circuit" or ASIC. An ASIC includes memory wherein identification data identifying the components of the TPMS may be entered, stored, and retrieved. The electronic packages 100, 106 are generically depicted in FIGS. 5–12 and include the transponder sensors, logic, memory, and RF transmitting systems necessary to perform tire cavity monitoring activity. The subject invention method is not transponder design specific and any one of multiple conventional transponder systems may be utilized and mounted to one or both surfaces 100, 104 of circuit board 98. The board 98 further includes lead receiving channels 108 fabricated within a board side.

Assembly of the transponder module proceeds generally as follows. The sleeve 90 is inserted within the through bore 88 of the toroidal body 82 which is then inserted into the chamber 62 of the housing base 52. Situated within chamber 62, the through bore 94 of sleeve 90 and the bore 99 of body 82 co-axially align with housing through bore 64. The winding 84 of body 82 is received within channel 96 of the sleeve 90 and leads 86 are routed upward. The number of turns in winding 84 is designed to impedance match the transponder electronics in a conventional manner. The board 98 mounts horizontally in the preferred embodiment within the housing 52 above the sleeve 90 and the toroidal body 82 through passage. Leads 86 from the winding 84 are routed into the channels 108 and electrically connected to the electronics 100, 106 on circuit board 98. The peripheral flange 78 of the cap member 68 is thereafter positioned upon the upper surface 66 of the housing 52 and the interface is sealed by application of a suitable adhesive.

Figures 7, 8:
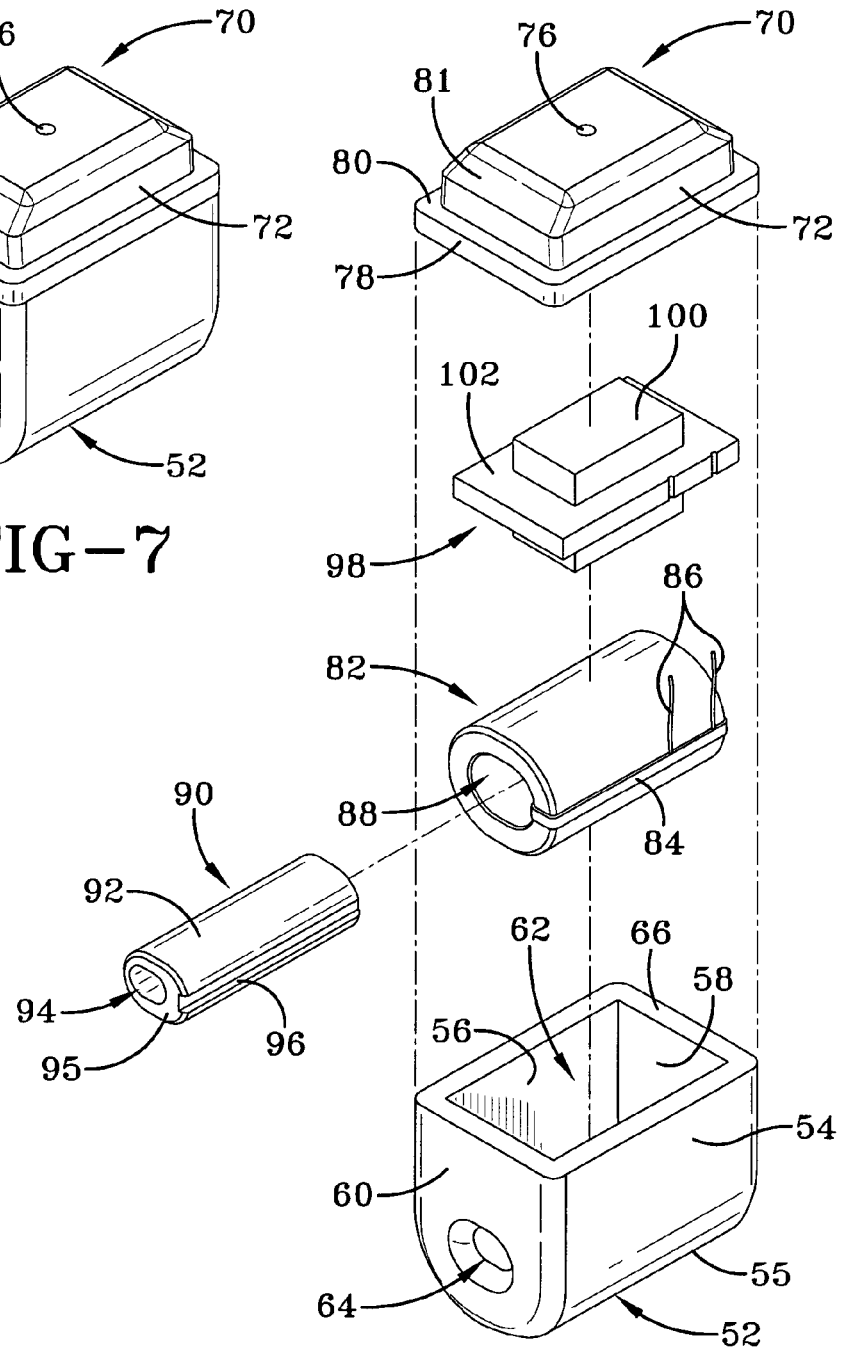
FIG. 7 is a front perspective view of a representative transponder module.
FIG. 8 is an exploded perspective view thereof.
Figure 9:
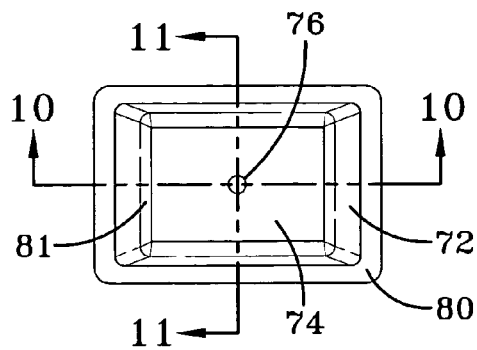
FIG. 9 is a top plan view thereof.
Figure 10:
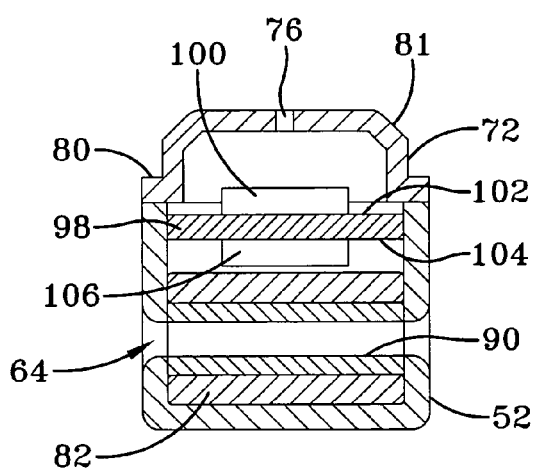
FIG. 10 is a longitudinal section view through the transponder module of FIG. 9 taken along the line 10—10.
Figure 11:
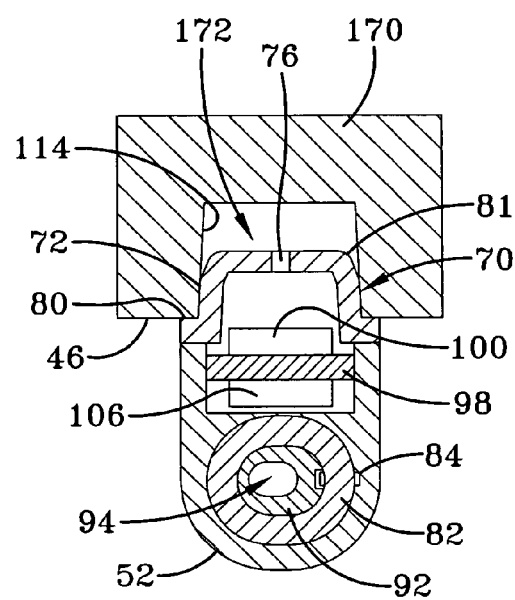
FIG. 11 is a transverse section view through the transponder module of FIG. 9 taken along the line 11—11.
Figure 12:
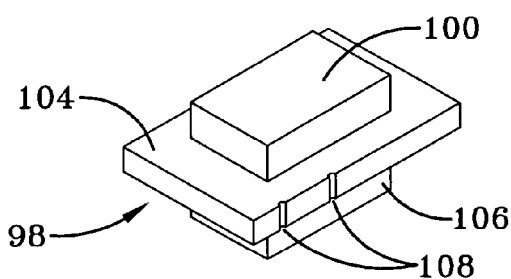
FIG. 12 is a perspective view of the module circuit board.
Figure 13:
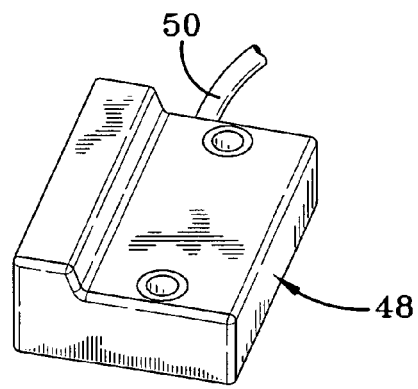
FIG. 13 is a perspective view of the receiver module.
Figure 14:
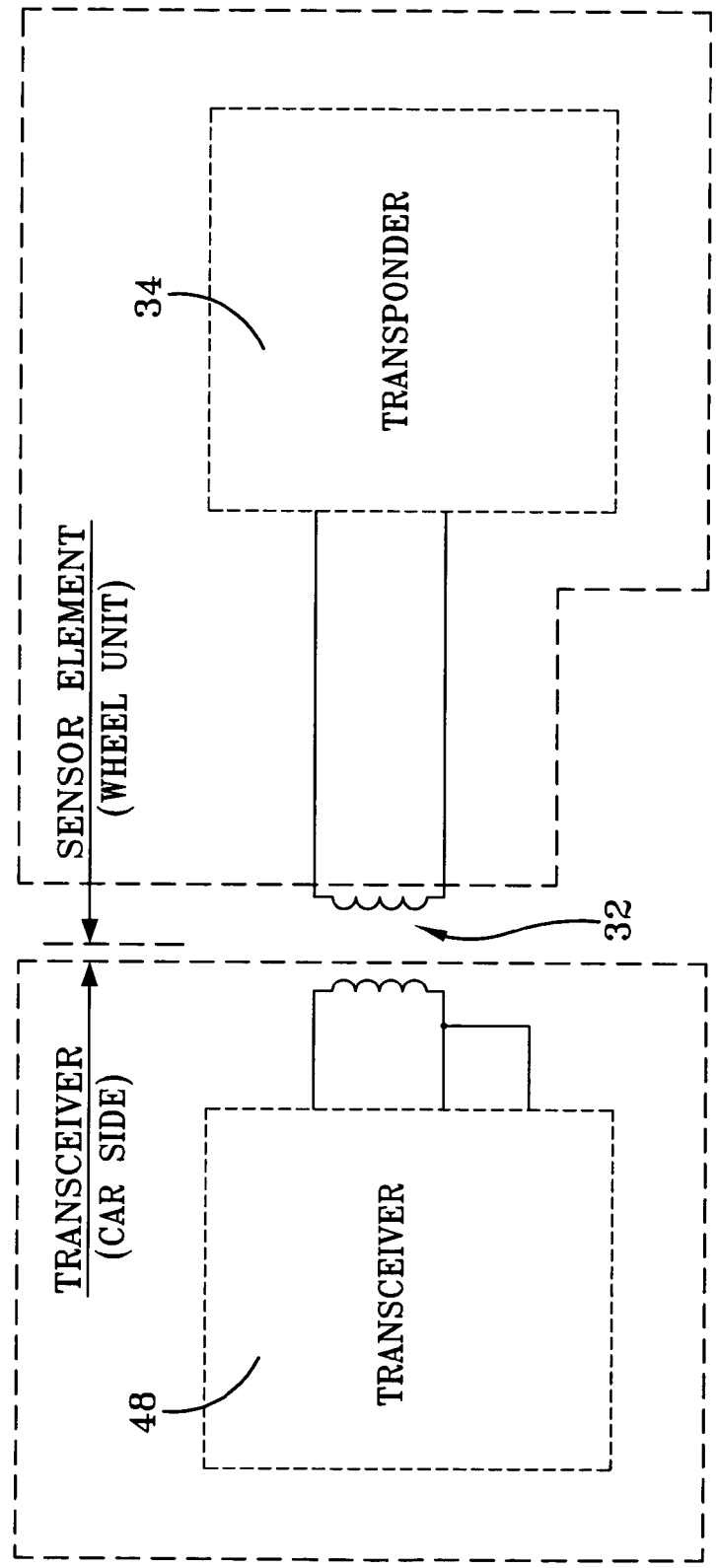
FIG. 14 is a block diagram of the car transceiver and tire monitoring system.

In the assembled condition, the transponder module 34 is as shown in FIG. 7. The transponder module housing, internal assembly, and component orientation may be varied if desired in the practice of the invention. The transponder module 34 thus comprises a sealed self contained unit that includes circuit board and transponder electronics for monitoring parameters of a tire cavity such as pressure and temperature. The electronics of the transponder module 34 may further include tire identification information. The toroidal body 82 is electro-magnetically and mechanically coupled to the transponder package 24 via winding 84. Alternatively, the body 82 may be eliminated and the antenna 32 electrically coupled directly to the transponder. The resultant annular assembly would likewise be positioned in the optimum location described above in a tire. A further alternative would be to couple the antenna 32 to the transponder through a transformer of conventional configuration having primary and secondary windings.

Figure 5:
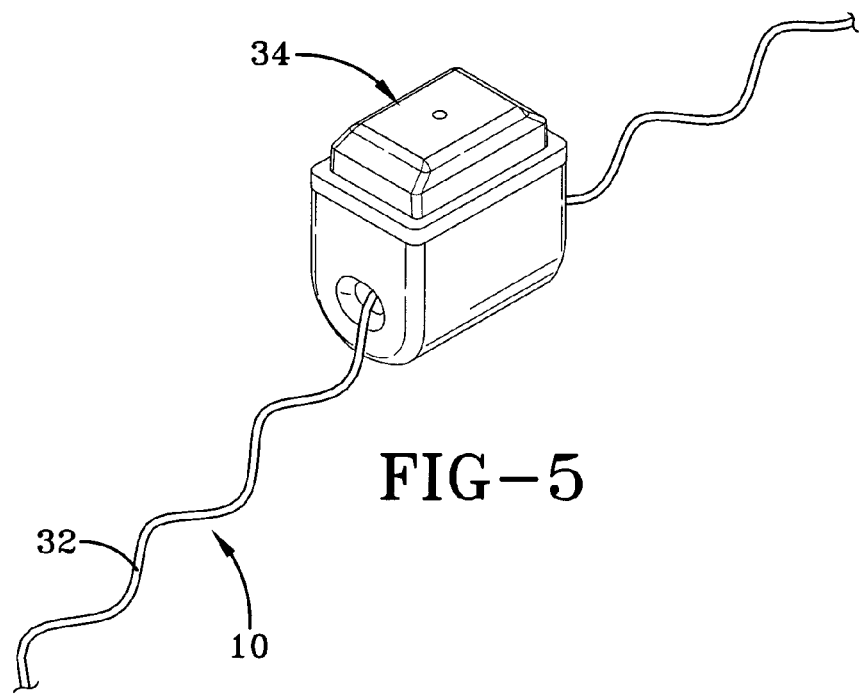
FIG. 5 is an enlarged perspective view of a representative antenna projecting through a transponder module.

The antenna 32 is routed through the transponder module 34 as seen best from FIG. 5 and comprises a continuous loop. The antenna 32 in the preferred embodiment is formed into a sinusoidal configuration, the sinusoidal shape serving to provide antenna elongation capacity with which to counter strain forces in the tire from its operation. The antenna 32 projects through bore 94 of sleeve 90, the bore 88 of body 82, and the through bore 64 of housing 52 in non-contacting manner. The antenna 32 is thus mechanically decoupled from the transponder module 34. It will be noted that the toroidal body 82 functions as a transformer in which the primary winding is eliminated. The antenna loop 32 is passed directly through the through bore 88 of the toroid 82 and couples magnetically with the body absent a primary winding. Electrical coupling occurs between the loop 32 and the toroidal body 82, and therefore into the winding 84 because the current induced in the loop antenna 32 from the transceiver 48 magnetic field creates a magnetic near the loop. The magnetic field is induced directly into the toroidal body 82 that closely surrounds the antenna loop wire(s) 32.

Such a coupling, designated herein as Direct Magnetic Coupling (DMC), affords several distinct advantages. The DMC approach allows the antenna loop to pass through the transponder package without a mechanical connection and therefore eliminates the problems with making and maintaining a connection between the loop wire and the transponder package discussed previously. The winding 84 turn ratio may be varied to accommodate optimum impedance matching. Secondly, the DMC technique provides a high energy coupling. Furthermore, the process of attaching the antenna loop to a transponder is simplified rendering the remote coupling between wire bundles or cables and transponders substantially less difficult. Moreover, the magnetic coupling between annular antenna and transponder using the DMC technique is maintained in a continuous 360 degree read and dead zones in the interrogation area are avoided.

As discussed previously, the assembly of FIG. 5 may be embedded into a tire during its manufacture, resulting in the tire assembly shown in FIG. 3, although it is not preferable to do so. Incorporation of the annular apparatus during tire build imposes substantial strain into the tire monitoring components and may result in component breakage. In a post cure state, removal of an annular assembly or any component therein may be difficult or impossible. Consequently, it is preferred that the subject annular assembly be affixed to a tire as a post tire build operation.

Figure 6:
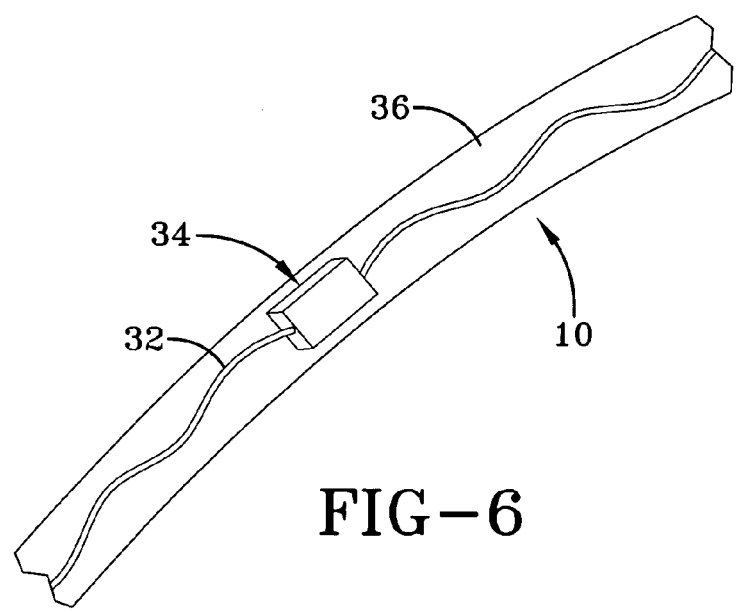
FIG. 6 is an enlarged perspective view of a portion of a representative annular assembly.

To do so, the antenna 32 and transponder module subassembly are first embedded within a rigid or semi-rigid carrier strip 36 shown in FIGS. 1 and 6. The strip 36 is formed from a non-conductive encapsulant material such as rubber or plastic and an annular assembly results that is unitary and readily transported, stored, and handled. Creation of a unitary combination of antenna, transponder, and carrier strip facilitates ease of incorporation of the annular assembly into a tire in a post build procedure. The assembly is positioned against the tire liner 22 at a location within the optimum region 44 discussed previously. The strip 36 is adhered to the tire by application of commonly available adhesives. Should the antenna transponder module break in transit or malfunction, the assembly 10 may be removed and replaced without damaging the tire. Moreover, the encapsulant material further serves to maintain the antenna and the toroidal body in their intended mutual orientation.

In order to facilitate the ready incorporation of the transponder module 34 into the carrier strip 36, the housing of the transponder 34 comprising cap 68 and base housing 52 are of a unique stepped and tapered configuration. The cap comprises the tapered snout 70 at an upper end defined by inward tapering surfaces 81. The cap 68 steps outward at the lower peripheral edge flange 78. As best viewed from FIGS. 7 and 11, the housing snout 70 is received within a cavity 112 within a mold block 110. The tapered profile renders the transponder housing self registering and centers the housing within cavity 112 prior to introduction of the carrier strip material. In the centered position, sidewalls 114 of the mold block 110 closely abut against cap surfaces 72 and lower surfaces 115 of block 110 abut the upper surface 80 of cap flange 78 to isolate and protect the snout 70 of cap 68 within the mold cavity 112. A bottom half of the mold block (not shown in FIG. 11) closes against the lower surfaces 115 of block 110 and material to form the carrier strip 36 is introduced into the mold cavity. Sealing abutment between mold block surfaces 114, 115 and cap surfaces 72, 80 prevent the carrier material from entering cavity 112 and thereupon invading the transponder aperture 76. Material forming the carrier strip 36, it will be appreciated, is filled up to the surface 80 of the flange 78, entirely encapsulating the antenna 32 and partially encapsulating the base 52 of the transponder module 34.

The mold halves are separated and the annular carrier strip with integrally captured antenna and transponder package removed from the mold. The subject annular assembly is thereafter affixed to the inner liner 22 of the tire 12 in the manner described previously and shown in FIGS. 1 and 6. The transponder module 34 may be oriented flat against the carrier strip as shown in FIG. 3 or oriented on end as shown in broken line at 34'. Whichever orientation is utilized, the strip material 36 serves to maintain the transponder and antenna in a preferred optimal mutual orientation and the transponder module 34 in an optimal orientation relative to the tire cavity. The port 76 in the upper surface 74 of the cap 68 is exposed to the tire cavity 24 free of the carrier strip 36. Direct communication between the tire cavity 24 and sensors mounted to the circuit board 98 is thereby facilitated through port 76. The stepped and tapered configuration of the transponder module 34 is preferred in order to make the module self centering in the mold and to allow a seal to be established between the mold and outer surfaces of the transponder module. The annular path defined between ledge surface 80 and vertical surface, sidewalls 72 of cap 68 and the inward facing surfaces of mold sidewalls 114 deters the flow of carrier material into cavity 112. Were the flow of material not inhibited, the material could enter cavity 112 and proceed through port 76 to the circuit board 90. The electronics and sensors mounted upon circuit board 98 are thus protected during the process of molding carrier strip 36 around the transponder module base 52 by the stepped configuration of the transponder housing.

In practice, the annular apparatus consisting of the antenna and coupled transponder is typically manufactured and assembled to a tire by the tire manufacturer form purchased components. The transponder 34, transceiver 48, and antenna wire 32 are sourced from supplying parties. The supplier typically identifies the components by identification data that may be stored within ASIC RAM memory in the transponder module 34. The tire manufacturer then assembles the transponder 34, antenna 32, and encapsulating ring 32 together to create the finished annular assembly. The annular assembly is thereafter affixed to a tire by the alternative methods described above. Pursuant to the invention, it is advantageous for the tire manufacturer to input tire identification data into ASIC memory whereby the identity of the tire and transponder components may be stored, cross-referenced, and retrieved as necessary.

The annular assembly 10 is affixed to tire 12 and, with a corresponding transceiver 48, supplied to a vehicle manufacturer. At some point along the production line, the tires are mounted to a specific vehicle and the transceiver 48 of each tire 12 mounted to the body of the vehicle opposite the antenna ring. The transceiver 48 is then either hard wired or connected via wireless transmission to a display unit. The display unit may either be a dedicated unit to the TPMS or visual and/or audible communication of measured data from transponders 34 may be integrated into dashboard displays.

While the method of the invention is practiced preferably by the annular antenna and transponder assembly described previously, the invention is not intended to be so limited. Other TPMS, such as valve stem mounted transponders, that communicate tire information by various means may utilized and practice the claimed method. Tire information generally measured in TPMS include pressure and temperature. However, the subject method is functional regardless of the specific physical properties of the tire that are monitored.

Figure 15:
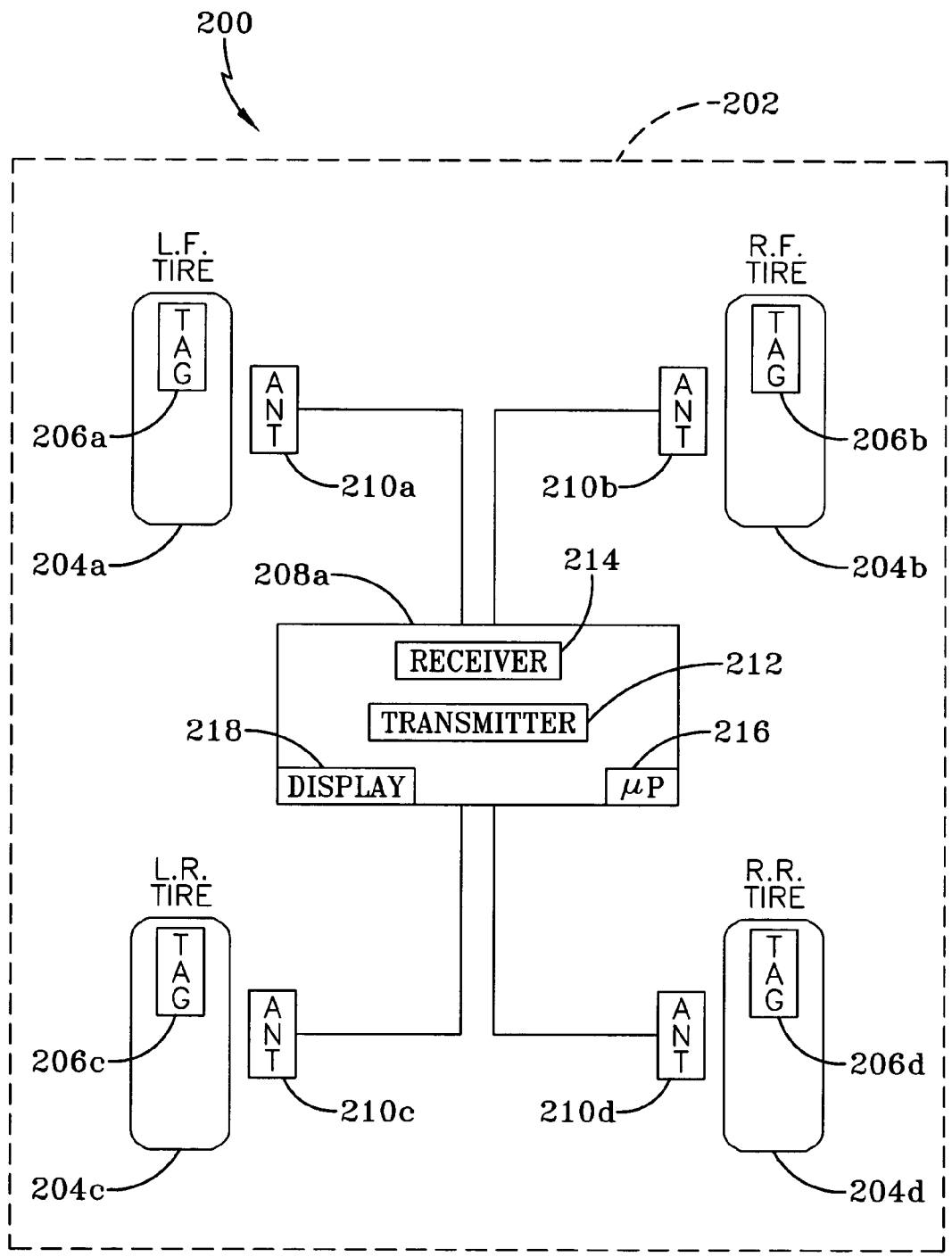
FIG. 15 is a simplified block diagram of a TPMS installed on a vehicle.

FIG. 15 illustrates a typical TPMS 200 installed on a motor vehicle 202 (shown in dashed lines) having four pneumatic tires 204a . . . 204d installed on four respective wheels (not shown). A transponder 206a . . . 206d of a type described previously or alternatively configured in a manner known to the industry is associated with each of the tires 204a . . . 204d, respectively. Each transponder impresses variable information (data) in a suitable format upon the transmitted signal indicative of a measured condition such as tire pressure or conditions (e.g. tire pressure, temperature, revolutions), as well as optionally impressing fixed information (e.g. tire ID, transponder I.D.) on the transmitted signal, as well as optionally responding to information which may be present on a signal which is received by the transponder.

The transponders 206a . . . 206d are preferably passive transponders as described above that obtain their operating power from an RF signal which is provided by an on-board interrogator 208 that is mounted within the vehicle.

The interrogator 208 comprises an RF transmitter 212 (e.g. for powering passive transponders), an RF receiver 214, control logic 216 which may include a microprocessor (uP), and a display device 218 such as a visual display and optionally including an audible alarm. Antennas (ANT) 210a . . . 210d are disposed on the vehicle 202, preferably adjacent the tires 204a . . . 204d, respectively, such as in the wheel wells of the vehicle. The antennas 210a . . . 210d are suitably ferrite loopstick antennas. In this manner, closes coupling can be effected between the transponder annular antennas and the vehicle antennas, thereby facilitating identifying which of the several wheels on a vehicle has a sensed low pressure condition.

In use, the interrogator 2108 powers the transponders 206a . . . 206d which, in turn, transmit data indicative of a measured condition (e.g. tire air pressure) back to the interrogator 208. In any such system, it is desirable to have efficient and effective coupling of signals between the fixed antennas 210a . . . 210d and the moving transponders. The annular antennas coupled to the transponders facilitate such an effective and efficient coupling. Communication between the transceivers 210a . . . 210d and the central receiver 214 may by means of hardwire or by means of an RF communications link.

Figure 16:
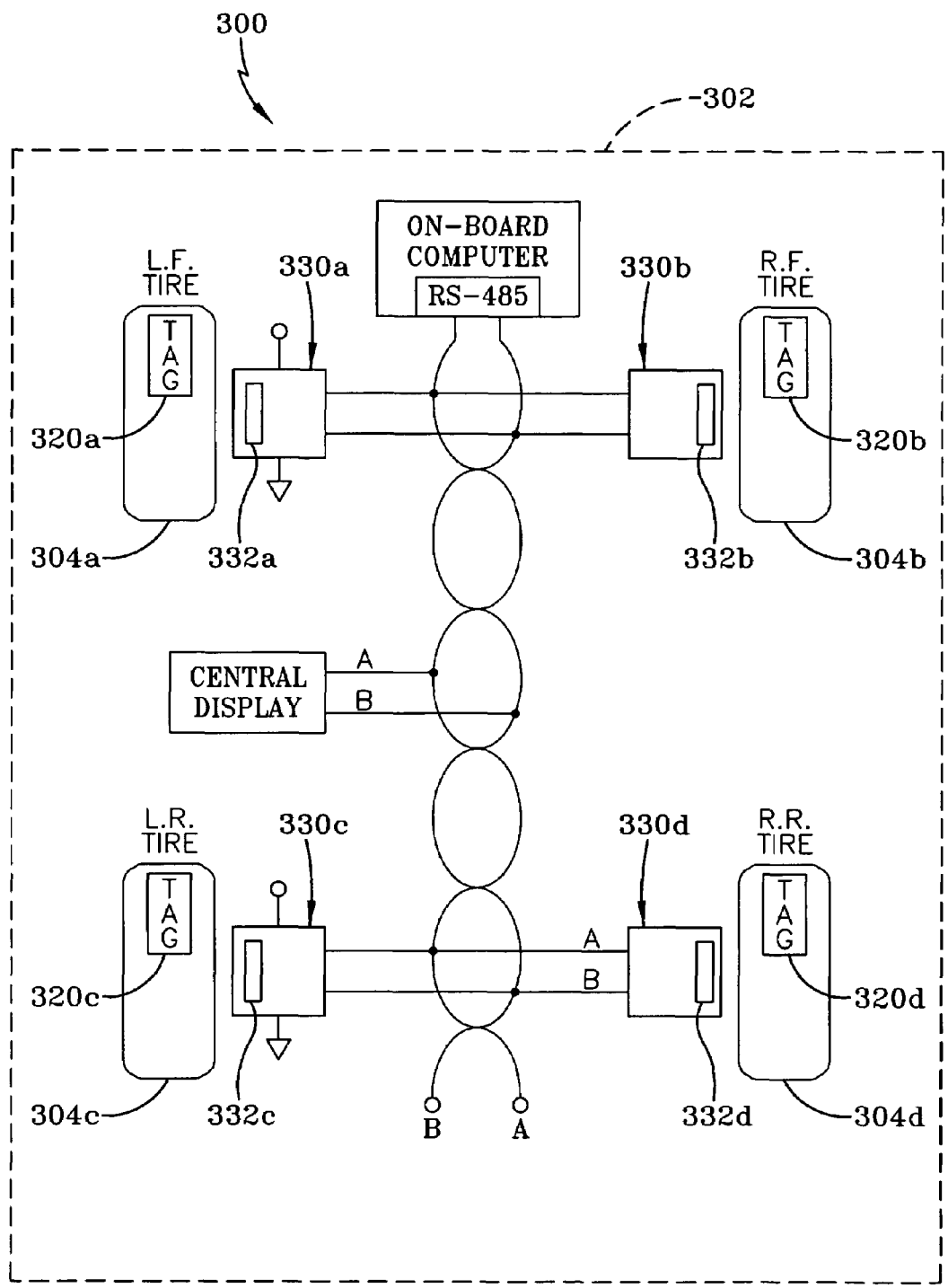
FIG. 16 is a schematic illustration of a multiplexed TPMS installed on a vehicle.

FIG. 16 illustrates an alternative embodiment of a TPMS 300 installed on a vehicle 302 (shown in dashed lines), such as a typical passenger vehicle having four pneumatic tires 304a . . . 304d installed on four respective wheels (not shown). The installation may occur along a production assembly line in the case of an OEM application or as replacement tires in a post-manufacturing environment.

The vehicle 302 is preferably equipped with an RS-485 (or equivalent) multiplexed serial data bus 306 controlled by an on-board vehicle computer 308 having an RS-485 interface 310. Computer 308 is commonly referred to as an electronic control module or "ECU". The data bus and computer network are installed during production line OEM assembly of a vehicle. A central display unit 312 is connected either directly to the computer 308 or is operatively connected (as shown) to the computer 308 via the data bus 306. In the absence of an existing vehicle data bus, a dedicated data bus may be provided so as to allow communication between the TPMS and the vehicle ECU.

Each of the four tires 304a . . . 304d is equipped with an electronic module ("Tag") 320a . . . 320d, as described previously, and associated sensor (not shown) capable of monitoring one or more conditions such as air pressure and air temperature within the tire and transmitting a radio frequency (RF) signal indicative of the monitored conditions within the respective vehicle tire.

The system 300 comprises four TPMS wheel station readers 330a . . . 330d, each associated with a respective one of the tires 304a . . . 304d and located in close proximity therewith, such as mounted within the wheel wells of the vehicle. Each reader 330a . . . 330d comprises an antenna (not shown) that is attached at a fixed position on the vehicle adjacent the tire, within the near field of the respective tag 320. Each reader 330 is connected to a source of power (as indicated by the lines terminating in circles and triangles) and is connected to the multiplexed serial data bus 306 for individually communicating with the on-board computer 308. Each reader 330a . . . 330d comprises a suitable data transceiver such as the DS36277 Dominant Mode Multipoint Transceiver by National Semiconductor to facilitate two-way data transmission via the data bus 306.

In this manner, monitored condition information carried by the RF signals from the respective tags 320 can be decoded and provided to the on-board computer 308 for subsequent display 312 to the operator of the vehicle. Regarding communications occurring over the serial data bus 306, multiplex (MUX) wiring, or networking, is generally well known, and has been introduced in automotive applications to address the increase in complexity and the number of onboard electronic devices in automobiles.

The tags 320 are commonly a transponder, an antenna, a receiver, a transmitter, a pressure sensor, a temperature sensor, and an ASIC chip that preferably has a unique identification (ID) number associated therewith. The tags are typically manufactured and assembled by an electronics manufacturer. The manufacturer of the tires 304a . . . 304d pursuant to the invention sources the tags 320 and incorporates a tag 320 into a respective tire 304 either by means of an annular assembly as described above or other known alternative means. The tire manufacturer pursuant to the invention may load a unique tire identification (ID) number into the transponder ASIC chip whereby the transponder and tire identification is cross-referenced.

In an OEM application, a vehicle manufacturer typically mounts the tires 304 to the vehicle tire to the vehicle body at some point along the assembly line. An OEM commonly maintains a database containing a unique identification (ID)

number for each vehicle manufactured. At the conclusion of the assembly process, it is common to run a diagnostic test of the ECU systems for the vehicle in order to assure proper operational capability. The result of such a diagnostic test is then down loaded into the OEM central database and maintained as part of a permanent vehicle record.

Referring to FIG. 17, the subject tire tag initialization procedure 400 is illustrated in block diagram form. The initialization procedure proceeds generally from tag to vehicle. Responsibility for certain steps in the procedure is divided preferably between the tag manufacturer 402, the tire manufacturer 404, and the OEM 406 as shown. However, the invention is not intended to be so restricted. Responsibility for every step in the process may be consolidated into one party if desired. Alternatively, the steps within the procedure may be realigned and assigned to more or less contributing parties if desired.

The tag manufacturer 402 as shown in FIG. 17 operates in the performance of steps 408, 410, and 412, culminating in a transfer of the tire tag to the tire manufacturer in step 414. Step 408 comprises the manufacture of the transponder and tag and may include such components in a housing of the type described above herein. The calibration 410 of the pressure and temperature sensors within the transponder and tag and the date for tag functions is next performed. The Tag ID and calibration data is then written into memory in step 412, followed by the transfer 414 of the tag to the tire manufacture.

The tire manufacturer 404 (preferably but not necessarily) continues the procedure by the manufacture of the tag and antenna assembly, indicated as step 416. As described above, an annular apparatus provides distinct advantages in communication between the tag and a vehicle mounted reader. However, other tag and antenna configurations are possible such as valve stem mounted transponders. The tire tag and antenna assembly is then integrated into a tire 418 and the tire identification data is loaded into ASIC memory 420. An OEM part number(s) for the tire and tag/antenna assembly may also be loaded into ASIC memory 422. The tire may thereafter be conveyed 424 to the vehicle OEM 406. After incorporation of the tire into an assembly line vehicle and interconnection of the tag reader into the vehicle data bus line, the OEM proceeds with system initialization 426 including writing the VIN (vehicle identification number) into tire tag ASIC memory and reading tire information data from the ASIC memory into vehicle ECU memory (step 428). The tire identification data is then uploaded (step 430) from the ECU to an OEM database where the information is maintained for future reference. The car, post assembly, is then transferred (step 432) typically to a vehicle dealer. The dealer, servicing party, or any other party having a need, may thereafter have the capability to read identification data for each tire and rewrite VIN data from the vehicle (step 434).

The advantages of the subject method are manifold. First, integrating tag, transponder, tire, and vehicle identification data into a single accessible database affords a convenient means for tracking the history of each component throughout the useful life of the vehicle. Substitution of parts or tires for original equipment can be ascertained in the event of an accident to aid in accident reconstruction or analysis. Moreover, when replacement of tires or tag/transponder parts becomes necessary, identification of original components will ensure the suitability of replacement parts. Thus, there will always be a capability to cross-reference the identity of the vehicle with the identity of the tires and TPMS components via the database created at the vehicle assembly stage.

Further, the subject method affords a means for creating such a database efficiently and effectively with minimal inconvenience to the sundry manufactures in the chain. The tag manufacturer can conveniently incorporate tag information into the ASIC memory prior to transfer of the tag to the tire manufacturer. Likewise, the tire manufacturer may incorporate tire identification information (including optional OEM part numbers) into the ASIC memory prior to transferring the tire to the OEM. The OEM also is provided with a convenient time and means for reading the tire and tag identification information into ECU memory and uploading such information to the OEM database. No dedicated external readers and antennas are required along the production line for reading tire tag identification transmissions. Rather, the reading of tire identification data is preferably deferred until an end-of-line diagnostic is conducted on the ECU and related systems. Access to data from the tire TPMS (ASIC) is thereby timely and efficient and such data may be uploaded to a database for future reference.

While the above sets forth a preferred embodiment and alternative embodiments of the subject invention, the invention is not intended to be so limited. Other embodiments that will be apparent to those skilled in the art and which utilize the teachings herein set forth, are intended to be within the scope and spirit of the present invention. By way of example, with no intent to limit the range of alternative embodiments, the subject correlation between tire identification and vehicle identification is not limited to passive sensor systems. Active systems, that is, systems including a tire or wheel mounted power source may be devised and employed using the subject method. For example, a valve stem sensor device having a battery supply can be deployed. In addition, while the embodiments discussed employ a tire mounted transponder and sensor package, the invention need not be so limited. A valve stem or wheel mounted transponder device may be utilized in the practice of the invention if so desired.

What is claimed is:

1. A method for integrating tire identification data and OEM vehicular identification data in a vehicle having a tire based sensor system, comprising the steps:
   a. manufacturing tire tag means comprising a transponder and a tire tag having at least a pressure sensor;
   b. calibrating the pressure sensor for tag functions;
   c. writing tag identification and calibration data into tag memory;
   d. transferring the tag means to a tire manufacturer;
   e. manufacturing a tag and antenna assembly;
   f. integrating the tag and antenna assembly into a tire;
   g. writing tire identification data into tag memory;
   h. transferring the tire to an OEM;
   i. initializing a vehicle system;
   j. reading tire identification data from tag memory into an electronic control unit of the vehicle; and
   k. uploading tire identification data from the electronic control unit to an OEM data base.

2. A method according to claim 1 including the step of writing an OEM part number into the tag memory prior to transferring the tire to an OEM.

3. A method according to claim 1 including the step of validating the tire identification data in the vehicle electronic control unit against the tire identification data of tires used by the vehicle throughout the lifecycle of the vehicle.

4. A method according to claim 1 including the step of writing a vehicle identification number to tag memory.

5. A method for integrating tire data into the information system of a vehicle, comprising the steps:

a. mounting a tire to a production line vehicle chassis, the tire having tire data storage means for storing tire identification data;
b. connecting the tire data storage means to a vehicle electronic control unit (ECU) having ECU data storage means;
c. reading tire identification data from the tire data storage means into the ECU data storage means; and
d. uploading the tire identification data from the ECU data storage means to an OEM database.

6. A method according to claim 5 further comprising the steps:
incorporating a tire pressure monitoring system into the tire; and
including tire pressure monitoring system identification data in the tire identification data.

7. A method according to claim 6 further comprising the step of incorporating tire pressure monitoring system operational parameters in the tire identification data.

8. A method according to claim 5 further comprising the steps:
incorporating vehicle identification data into the ECU database means;
uploading the vehicle identification data from the ECU data storage means to the OEM database.

9. A method according to claim 5, further comprising the steps:
running a diagnostic test on the vehicle substantially at the conclusion of vehicle assembly; and
reading the tire identification data from the tire data storage means into the ECU data storage means substantially contemporaneous with the running of the diagnostic test.

10. A method according to claim 5 further comprising the step of connecting the tire data storage means to the vehicle electronic control unit by means of a vehicle data bus.

* * * * *